US012763983B2

(12) United States Patent
Zheng et al.

(10) Patent No.: US 12,763,983 B2
(45) Date of Patent: Oct. 13, 2026

(54) POLLING DEVICE FOR MULTICAST BROADCAST SERVICE INTEREST INDICATION

(71) Applicant: Nokia Technologies Oy, Espoo (FI)

(72) Inventors: Naizheng Zheng, Beijing (CN); David Navrátil, Espoo (FI); Athul Prasad, Naperville, IL (US); Ugur Baran Elmali, Munich (DE); David Bhatoolaul, Swindon (GB)

(73) Assignee: Nokia Technologies Oy, Espoo (FI)

( * ) Notice: Subject to any disclaimer, the term of this patent is extended or adjusted under 35 U.S.C. 154(b) by 338 days.

(21) Appl. No.: 18/560,395

(22) PCT Filed: May 11, 2021

(86) PCT No.: PCT/CN2021/093121
§ 371 (c)(1),
(2) Date: Nov. 12, 2023

(87) PCT Pub. No.: WO2022/236705
PCT Pub. Date: Nov. 17, 2022

(65) Prior Publication Data
US 2024/0259225 A1 Aug. 1, 2024

(51) Int. Cl.
*H04L 12/18* (2006.01)
*H04W 72/232* (2023.01)
*H04W 72/30* (2023.01)

(52) U.S. Cl.
CPC ......... *H04L 12/185* (2013.01); *H04W 72/232* (2023.01); *H04W 72/30* (2023.01)

(58) Field of Classification Search
None
See application file for complete search history.

(56) References Cited

U.S. PATENT DOCUMENTS 11,140,676 B2 * 10/2021 Li ......................... H04W 76/18
11,212,761 B2 * 12/2021 Zhang ............... H04W 72/0453
(Continued)

FOREIGN PATENT DOCUMENTS

CN 111357376 A 6/2020
CN 111699722 A 9/2020
(Continued)

OTHER PUBLICATIONS

"pdcchorder", Retrieved on Mar. 11, 2024, Webpage available at : https://3.bp.blogspot.com/ Kx39uHuHgYM/V7HxeYO4ghl/AAAAAAAAG1s/POlh9jv_THgLFVFCjGXRI3T8TzR1aHhjgCLcB/s1600/pdcchorder.png.
(Continued)

*Primary Examiner* — Melvin H Pollack
(74) *Attorney, Agent, or Firm* — Lippes Mathais LLP

(57) ABSTRACT

Example embodiments of the present disclosure relate to polling a device for multicast broadcast service interest indication. A first device receives, from a second device, a physical downlink control channel (PDCCH) order addressed by a paging radio network temporary identifier for the first device. The PDCCH order comprises a request for an indication that at least one multicast broadcast service is to be received by the first device. The first device transmits, to the second device, a random access preamble associated with the at least one multicast broadcast service as a response to the request. Through this solution, the first device that monitors the single PDCCH order may have less power consumption.

20 Claims, 6 Drawing Sheets

(56) References Cited

U.S. PATENT DOCUMENTS

| | | | | |
|---|---|---|---|---|
| 11,212,763 | B2 * | 12/2021 | Hong | H04L 5/0048 |
| 11,224,077 | B2 * | 1/2022 | Lei | H04W 52/146 |
| 11,405,145 | B2 * | 8/2022 | Xiong | H04L 5/10 |
| 11,452,032 | B2 * | 9/2022 | Gupta | H04W 24/08 |
| 11,540,250 | B2 * | 12/2022 | Hwang | H04W 4/14 |
| 11,700,102 | B2 * | 7/2023 | Herath | H04L 5/0053 370/330 |
| 11,711,826 | B2 * | 7/2023 | Zhu | H04W 24/08 370/329 |
| 11,716,747 | B2 | 8/2023 | Sebire et al. | |
| 11,758,444 | B2 * | 9/2023 | Kim | H04W 36/0038 370/310 |
| 11,818,738 | B2 * | 11/2023 | Manolakos | H04W 72/51 |
| 12,010,734 | B2 * | 6/2024 | Sosnin | H04W 74/0866 |
| 12,022,392 | B2 * | 6/2024 | Jo | H04W 72/23 |
| 12,052,708 | B2 * | 7/2024 | Takahashi | H04L 5/0094 |
| 12,096,489 | B2 * | 9/2024 | Wang | H04W 74/006 |
| 12,127,171 | B2 * | 10/2024 | You | H04W 72/29 |
| 12,144,001 | B2 * | 11/2024 | Park | H04W 72/23 |
| 12,176,988 | B2 * | 12/2024 | Miao | H04B 7/06964 |
| 12,213,179 | B2 * | 1/2025 | Xiong | H04W 74/0833 |
| 12,250,722 | B2 * | 3/2025 | Myung | H04W 72/1263 |
| 12,256,436 | B2 * | 3/2025 | Zhang | H04W 72/1268 |
| 12,267,872 | B2 * | 4/2025 | Lu | H04W 74/006 |
| 12,302,402 | B2 * | 5/2025 | Lee | H04W 74/0833 |
| 12,317,325 | B2 * | 5/2025 | Lim | H04W 72/1268 |
| 12,355,574 | B2 * | 7/2025 | Jang | H04L 1/1864 |
| 12,439,335 | B2 * | 10/2025 | Seo | H04W 76/28 |
| 12,452,812 | B2 * | 10/2025 | You | H04W 56/0055 |
| 2013/0039248 | A1 * | 2/2013 | Koskinen | H04W 76/40 370/312 |
| 2019/0222967 | A1 * | 7/2019 | Ratilainen | H04L 1/1887 |
| 2020/0037367 | A1 | 1/2020 | Kim et al. | |
| 2020/0045669 | A1 | 2/2020 | Hwang et al. | |
| 2021/0051710 | A1 | 2/2021 | Cirik et al. | |
| 2022/0039138 | A1 * | 2/2022 | Takeda | H04W 72/23 |
| 2023/0104628 | A1 * | 4/2023 | Tao | H04W 8/02 370/329 |
| 2024/0031776 | A1 * | 1/2024 | Dai | H04W 4/06 |
| 2024/0187984 | A1 * | 6/2024 | Ohara | H04W 52/0274 |
| 2025/0301282 | A1 * | 9/2025 | Babaei | H04W 4/06 |

FOREIGN PATENT DOCUMENTS

| | | | |
|---|---|---|---|
| EP | 3668263 | A1 | 6/2020 |
| WO | 2020/253572 | A1 | 12/2020 |

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.5.0, Mar. 2021, pp. 1-151.

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

"3rd Generation Partnership Project; Technical Specification Group Radio Access Network; Evolved Universal Terrestrial Radio Access (E-UTRA); Multiplexing and channel coding (Release 16)", 3GPP TS 36.212, V16.5.0, Mar. 2021, pp. 1-255.

"3rd Generation Partnership Project; Technical Specification Group Radio Access Network; NR; Multiplexing and channel coding (Release 17)", 3GPP TS 38.212, V17.1.0, Mar. 2022, pp. 1-197.

"Summary for [102-e-NR-7.1CRs-08] QCL assumption for paging reception", 3GPP TSG RAN WG1 #102-e, R1-2005979, Agenda Item: 7.1, OPPO, Aug. 17-28, 2020, 8 pages.

"Summary# on mechanisms to support group scheduling for RRC_CONNECTED UEs for NR MBS", 3GPP TSG RAN WG1 #104b-e, R1-21XXXX, Agenda item: 8.12.1, CMCC, Apr. 12-20, 2021, pp. 1-120.

IEEE 802.11, Wikipedia, Retrieved on Mar. 11, 2024, Webpage available at : https://en.wikipedia.org/wiki/IEEE_802.11.

International Search Report and Written Opinion received for corresponding Patent Cooperation Treaty Application No. PCT/CN2021/093121, dated Feb. 7, 2022, 9 pages.

"Miscellaneous Aspects of MBS Provisioning", 3GPP TSG-RAN WG2 Meeting #113bis Electronic, R2-2102946, Agenda item: 8.1.2.4, Nokia, Apr. 12-20, 2021, 2 pages.

"Counting the MBS interest", 3GPP TSG-RAN WG3 Meeting #109 electronic, R3-204886, Agenda Item: 22.4, vivo, Aug. 17-28, 2020, 2 pages.

* cited by examiner

POLLING DEVICE FOR MULTICAST BROADCAST SERVICE INTEREST INDICATION

RELATED APPLICATION

This application was originally filed as PCT Application No. PCT/CN2021/093121 on May 11, 2021, which is incorporated herein by reference in its entirety.

FIELD

Embodiments of the present disclosure generally relate to the field of telecommunication and in particular, to devices, methods, apparatuses and computer readable storage medium for polling a device for multicast broadcast service interest indication.

BACKGROUND

Recently, several solutions have been proposed to provide efficient and reliable solutions for communication. A technology named "Multicast Broadcast Service (MBS)" has been proposed to make it possible for efficient use of radio and network resources while transmitting multicast broadcast services, e.g. audio and video contents to a large group of end users. In a scenario of the MBS, both point-to-point (PTP) and point-to-multi point (PTM) are supported when a network device transmits MBS data packets in downlink. The term "PTP mode" means that packets are sent in downlink using unicast to a specific terminal device with a Cell-Radio Network Temporary Identity (C-RNTI). The term "PTM mode" means that the packets are sent in downlink using multicast/broadcast to a group of terminal devices sharing a Group-Radio Network Temporary Identity (G-RNTI). Solutions on improving performances of MBS need to be further studied.

SUMMARY

In general, example embodiments of the present disclosure provide a solution for polling a device for multicast broadcast service interest indication. Embodiments that do not fall under the scope of the claims, if any, are to be interpreted as examples useful for understanding various embodiments of the disclosure.

In a first aspect, there is provided a first device. The first device comprises at least one processor; and at least one memory including computer program code. The at least one memory and the computer program code are configured to, with the at least one processor, cause the first device to: receive, from a second device, a physical downlink control channel (PDCCH), order addressed by a paging radio network temporary identifier for the first device, the PDCCH order comprising a request for an indication that at least one multicast broadcast service is to be received by the first device; and transmit, to the second device, a random access preamble associated with the at least one multicast broadcast service as a response to the request.

In a second aspect, there is provided a second device. The second device comprises at least one processor; and at least one memory including computer program code. The at least one memory and the computer program code are configured to, with the at least one processor, cause the second device to: transmit, to a first device, a physical downlink control channel (PDCCH) order addressed by a paging radio network temporary identifier for the first device, the PDCCH order comprising a request for an indication that at least one multicast broadcast service is to be received by the first device; and receive, from the first device, a random access preamble associated with the at least one multicast broadcast service as a response to the request.

In a third aspect, there is provided a first device. The first device comprises at least one processor; and at least one memory including computer program code. The at least one memory and the computer program code are configured to, with the at least one processor, cause the first device to: receive, from a second device, a physical downlink control channel (PDCCH) order addressed by a group radio network temporary identifier for the first device, the PDCCH order indicating the number of repetitions of a random access preamble; and transmit, to the second device, the random access preamble based on the number of repetitions of the random access preamble.

In a fourth aspect, there is provided a second device. The second device comprises at least one processor; and at least one memory including computer program code. The at least one memory and the computer program code are configured to, with the at least one processor, cause the second device to: transmit, to a first device, a physical downlink control channel (PDCCH) order addressed by a group radio network temporary identifier for the first device, the PDCCH order indicating the number of repetitions of a random access preamble; and receive, from the first device, the random access preamble based on the number of repetitions of the random access preamble.

In a fifth aspect, there is provided a first apparatus. The first apparatus comprises: means for receiving, from a second apparatus, a physical downlink control channel (PDCCH) order addressed by a paging radio network temporary identifier for the first apparatus, the PDCCH order comprising a request for an indication that at least one multicast broadcast service is to be received by the first apparatus; and means for transmitting, to the second apparatus, a random access preamble associated with the at least one multicast broadcast service as a response to the request.

In a sixth aspect, there is provided a second apparatus. The second apparatus comprises: means for transmitting, to a first apparatus, a physical downlink control channel (PDCCH) order addressed by a paging radio network temporary identifier for the first apparatus, the PDCCH order comprising a request for an indication that at least one multicast broadcast service is to be received by the first apparatus; and means for receiving, from the first apparatus, a random access preamble associated with the at least one multicast broadcast service as a response to the request.

In a seventh aspect, there is provided a first apparatus. The first apparatus comprises: means for receiving, from a second apparatus, a physical downlink control channel (PDCCH) order addressed by a group radio network temporary identifier for the first apparatus, the PDCCH order indicating the number of repetitions of a random access preamble; and means for transmitting, to the second apparatus, the random access preamble based on the number of repetitions of the random access preamble.

In an eighth aspect, there is provided a second apparatus. The second apparatus comprises: means for transmitting, to a first apparatus, a physical downlink control channel (PDCCH) order addressed by a group radio network temporary identifier (G-RNTI) for the first apparatus, the PDCCH order indicating the number of repetitions of a random access preamble; and means for receiving, from the first apparatus, the random access preamble based on the number of repetitions of the random access preamble.

In a ninth aspect, there is provided a method implemented at a first device. The method comprises: receiving, at a first device from a second device, a physical downlink control channel (PDCCH) order addressed by a paging radio network temporary identifier for the first device, the PDCCH order comprising a request for an indication that at least one multicast broadcast service is to be received by the first device; and transmitting, to the second device, a random access preamble associated with the at least one multicast broadcast service as a response to the request.

In a tenth aspect, there is provided a method implemented at a second device. The method comprises: transmitting, from a second device to a first device, a physical downlink control channel (PDCCH) order addressed by a paging radio network temporary identifier for the first device, the PDCCH order comprising a request for an indication that at least one multicast broadcast service is to be received by the first device; and receiving, from the first device, a random access preamble associated with the at least one multicast broadcast service as a response to the request.

In an eleventh aspect, there is provided a method implemented at a first device. The method comprises: receiving, at a first device from a second device, a physical downlink control channel (PDCCH) order addressed by a group radio network temporary identifier for the first device, the PDCCH order indicating the number of repetitions of a random access preamble; and transmitting, to the second device, the random access preamble based on the number of repetitions of the random access preamble.

In a twelfth aspect, there is provided a method implemented at a second device. The method comprises: transmitting, from a second device to a first device, a physical downlink control channel (PDCCH) order addressed by a group radio network temporary identifier for the first device, the PDCCH order indicating the number of repetitions of a random access preamble; and receiving, from the first device, the random access preamble based on the number of repetitions of the random access preamble.

In a thirteenth aspect, there is provided a computer readable medium. The computer readable medium comprises program instructions for causing an apparatus to perform at least the method according to the ninth aspect.

In a fourteenth aspect, there is provided a computer readable medium. The computer readable medium comprises program instructions for causing an apparatus to perform at least the method according to the tenth aspect.

In a fifteenth aspect, there is provided a computer readable medium. The computer readable medium comprises program instructions for causing an apparatus to perform at least the method according to the eleventh aspect.

In a sixteenth aspect, there is provided a computer readable medium. The computer readable medium comprises program instructions for causing an apparatus to perform at least the method according to the twelfth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
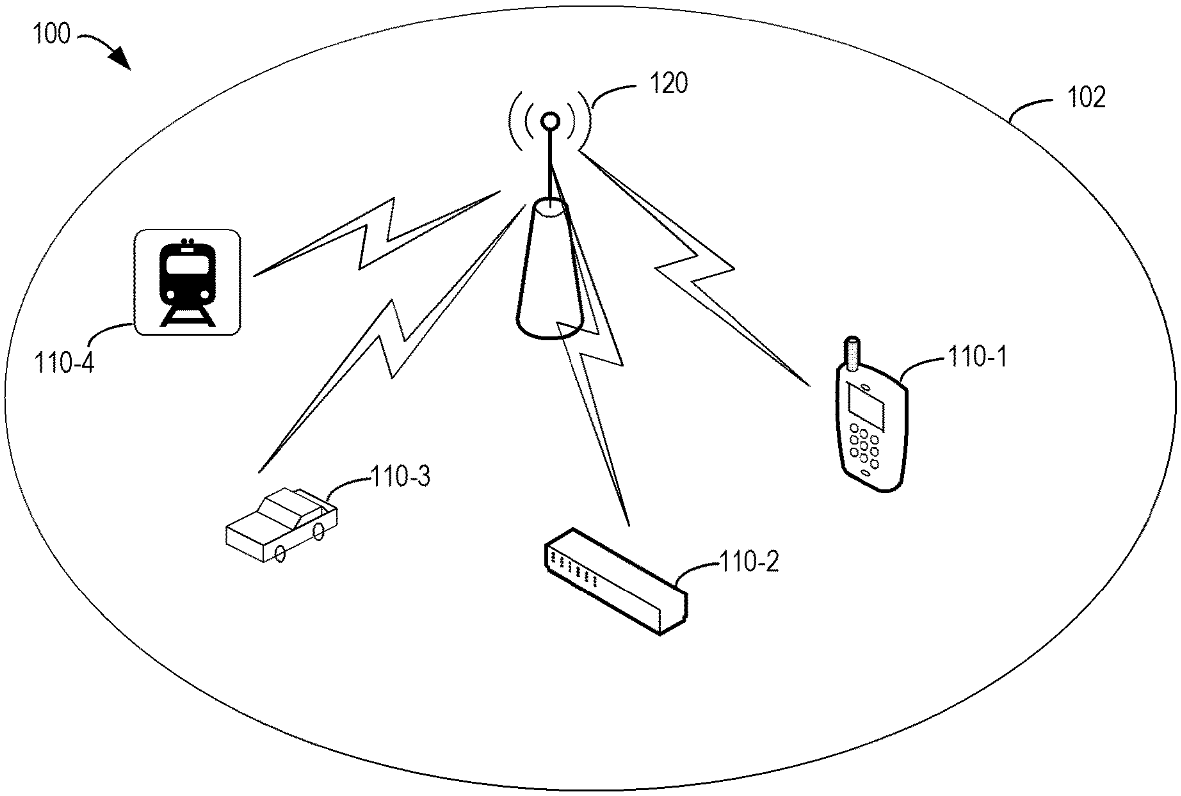
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated and Access Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

FIG. 1 shows an example communication environment 100 in which example embodiments of the present disclosure can be implemented. In the communication environment 100, a plurality of communication devices, including one or more first devices 110-1, 110-2, 110-3, 110-4 can communicate with a second device 120. For the purpose of discussion, the first devices 110-1, 110-2, 110-3 and 110-4 are collectively referred to as first devices 110 or individually referred to as first device 110.

In the example of FIG. 1, the first devices 110 are illustrated as terminal devices, and the second device 120 is illustrated as a network device serving the terminal devices. It is noted that the terms "first device" and "second device" are used for ease of description only. The serving area of the second device 120 may be called a cell 102.

In some example embodiments, the first device 110 may be in an idle mode or an inactive mode.

It is to be understood that the number of devices and their connections shown in FIG. 1 are only for the purpose of illustration without suggesting any limitation. The environment 100 may include any suitable number of devices adapted for implementing embodiments of the present disclosure. Although not shown, it would be appreciated that one or more additional devices may be located in the cell 102, and one or more additional cells may be deployed in the environment 100. It is noted that although illustrated as a network device, the second device 120 may be other device than the network device. Although illustrated as terminal devices, the first devices 110 may be other devices than the terminal devices.

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

In some example embodiments, the first device 110 is a terminal device and the second device 120 is a network device, a link from the second device 120 to the first device 110 is referred to as a downlink (DL), while a link from the first device 110 to the second device 120 is referred to as an uplink (UL).

In some example embodiments, the first devices 110 may share a Group-Radio Network Temporary Identity (G-RNTI). Thus, the second device 120 may transmit packets of the MBS using multicast to the first devices 110. Before transmitting the packets of the MBS to the first devices 110, the second device 120 may poll the first devices 110 for MBS interest.

It was proposed to use a Physical Downlink Control Channel (PDCCH) order addressed by a G-RNTI to poll a terminal device to report an MBS interest. If a separate or different PDCCH monitoring occasion for the PDCCH order is configured other than the PDCCH monitoring occasion for paging, it may bring an extra wake-up occasion for the terminal device to monitor Downlink Control Information (DCI) for the PDCCH order. This is obviously not beneficial from power saving perspective for the terminal device. Moreover, simultaneous reception of paging information and PDCCH order information is not possible due to separately configured PDCCH monitoring occasions for PDCCH order and paging.

Alternatively, in order to enable the simultaneous reception of paging and PDCCH order information, the PDCCH monitoring occasion for PDCCH order may be configured to be the same as the PDCCH monitoring occasion for paging by a network device. In such case, the terminal device may need to try to decode the DCI by descrambling Cyclic Redundancy Check (CRC) with both G-RNTI and Paging-Radio Network Temporary Identifier (P-RNTI) at a certain time occasion. If the terminal device receives both the paging information with P-RNTI and PDCCH order information with G-RNTI in a certain paging frame (PF) and paging occasion (PO), the terminal device may need to have the capability to simultaneously receive and decode both DCI formats. In other words, the terminal device may need to have the capability to simultaneously receive and decode one DCI with P-RNTI for paging and another DCI with G-RNTI for PDCCH order. Furthermore, considering from power consumption perspective, to enable the simultaneous reception of paging and PDCCH order information, the terminal device may need to perform extra descrambling with G-RNTI and decoding with corresponding DCI format. This may bring extra power consumption for the terminal device.

In accordance with some example embodiments of the present disclosure, there is provided a solution for polling a device for MBS interest indication. In this solution, a first device receives, from a second device, a PDCCH order addressed by a P-RNTI for the first device. The PDCCH order comprises a request for an indication that at least one multicast broadcast service is to be received by the first device. The first device transmits, to the second device, a random access preamble associated with the at least one multicast broadcast service as a response to the request. In this manner, the first device that monitors the single PDCCH order may have less power consumption.

It may be understood that a conventional PDCCH order may initiate a procedure to bring uplink out-of-sync terminal device back to in-sync state in case there is downlink data available for it. This may happen in a situation when the Time Alignment timer gets expired because there is no uplink and downlink data transmission for some time, due to which the timing advance information is no longer valid, and also when there is no Time Alignment command received from a network device. A Time Alignment timer basically controls how long the terminal device is considered uplink time aligned, before going to out-of-sync.

However, unlike the conventional PDCCH order, the PDCCH order in present disclosure may not initiate a full random access procedure, and it just initiates transmission of a random access preamble.

Example embodiments of the present disclosure will be described in detail below with reference to the accompanying drawings.

Figure 2:
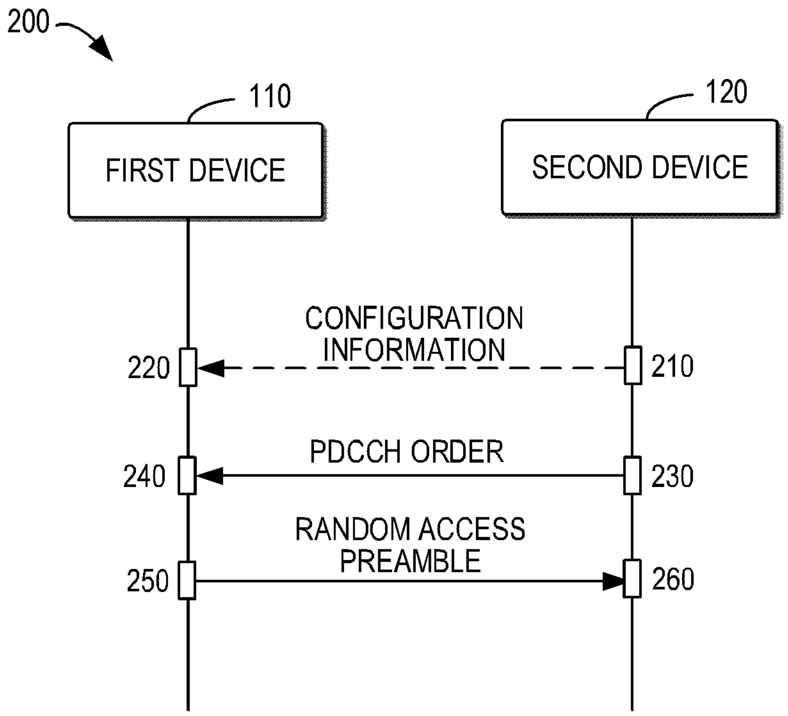
FIG. 2 illustrates a signaling flow for polling a device for MBS interest indication in accordance with some example embodiments of the present disclosure.

Reference is now made to FIG. 2, which shows a signaling flow 200 for polling a device for MBS interest indication in accordance with some example embodiments of the present disclosure. For the purpose of discussion, the signaling flow 200 will be described with reference to FIG. 1. The signaling flow 200 may involve the first device 110 and the second device 120 in FIG. 1.

In the signaling flow 300, the second device 120 transmits 230, to the first device 110, a PDCCH order addressed by a P-RNTI for the first device 110. The PDCCH order comprises a request for an indication that at least one MBS is to be received by the first device 110. Accordingly, the first device 110 receives 240 the PDCCH order from the second device 120.

If the first device 110 successfully decodes the PDCCH order with the P-RNTI for the first device 110, the first device 110 transmits 250, to the second device 120, a random access preamble associated with the at least one multicast broadcast service as a response to the request.

Accordingly, the second device 120 receives 260 the random access preamble associated with the at least one multicast broadcast service. In this way, with the random access preamble associated with the at least one multicast broadcast service, the first device 110 may indicate that the at least one multicast broadcast service is to be received by the first device. In other words, with the random access preamble associated with the at least one multicast broadcast service, the first device 110 may indicate that the first device 110 has an interest in the at least one multicast broadcast service.

With the present disclosure, the first device 110 may monitor the single PDCCH order and thus may have less power consumption.

In some example embodiments, the first device 110 may receive the PDCCH order by receiving DCI for at least one of short messages and scheduling information for a paging message. The DCI comprises an indication of the PDCCH order. In such example embodiments, the DCI may comprise a first field for a short message indicator, and the first field comprises the indication of the PDCCH order. Alternatively, the DCI may comprise a second field for the short messages, and the second field comprises the indication of the PDCCH order.

In some example embodiments, the DCI may comprise DCI format 1_0 with CRC scrambled with the P-RNTI for the first device 110. Tables 1 and 2 show fields in the DCI format 1_0 with CRC scrambled with the P-RNTI in accordance with some example embodiments of the present disclosure.

TABLE 1

| Field (Item) | Bits | Reference |
|---|---|---|
| Short Message Indicator | 2 | Refer to Table 2 below |
| Short Messages | 8 | This field is set as reserved when 'Short Message Indicator' field is 01 and 00. Refer to 38.331-Table 6.5-1 |
| Frequency domain resource assignment | Variable | Variable with DL BWP N_RB<br>$\lceil \log_2(N_{RB}^{DL,BWP}(N_{RB}^{DL,BWP}+1)/2) \rceil$<br>$N_{RB}^{DL,BWP}$ indicates the size of CORESET 0<br>If only the short message is carried, this bit field is reserved. |
| Time domain resource assignment | 4 | Carries the row index of the items in pdsch_allocationList in RRC.<br>If only the short message is carried, this bit field is reserved. |
| VRB-to-PRB mapping | 1 | According to TS38.212 Table 7.3.1.2.2-5<br>0: Non-Interleaved/I: Intverleaved<br>If only the short message is carried, this bit field is reserved. |
| Modulation and coding scheme | 5 | 38.214 - Table 5.1.3.1-1: MCS index table 1 for PDSCH<br>38.214 - Table 5.1.3.1-2: MCS index table 2 for PDSCH<br>If only the short message is carried, this bit field is reserved. |
| TB Scaling | 2 | If only the short message is carried, this bit field is reserved. |
| PDCCHOrderIndex | X bits | For MBS, use the reserved bits for indication of PDCCHOrderIndex |
| Reserved | 6-X | Reserved |

TABLE 2

| Bit Field | Short Message Indicator |
|---|---|
| 00 | PDCCH order is present in the DCI |
| 01 | Only scheduling information for Paging is present in the DCI |
| 10 | Only short message is present in the DCI |
| 11 | Both scheduling information for Paging and short message are present in the DCI |

Conventionally, the DCI format 1_0 with CRC scrambled with the P-RNTI was used to carry at least one of short messages and scheduling information for a paging message. In that case, the "Short Message Indicator" field in Table 1 is set to be "00" indicating that this field is reserved.

In the example as shown in Tables 1 and 2, the PDCCH order is considered as a message other than short messages and scheduling information for the paging message, and the DCI format 1_0 with CRC scrambled with the P-RNTI may be used to carry the PDCCH order. In this case, the "Short Message Indicator" field in Table 1 is set to be "00" indicating that the PDCCH order is present in the DCI. In addition, the "Short Messages" field is set as reserved when "Short Message Indicator" field is set to be 01 and 00.

Tables 3 and 4 show fields in the DCI format 1_0 with CRC scrambled with the P-RNTI in accordance with some other example embodiments of the present disclosure.

TABLE 3

| Field (Item) | Bits | Reference |
|---|---|---|
| Short Message Indicator | 2 | Refer to TS38.212 - Table 7.3.1.2.1-1 |
| Short Messages | 8 | Refer to Table 4 below |
| Frequency domain resource assignment | Variable | Variable with DL BWP N_RB<br>$\lceil \log_2(N_{RB}^{DL,BWP}(N_{RB}^{DL,BWP}+1)/2) \rceil$<br>$N_{RB}^{DL,BWP}$ indicates the size of CORESET 0<br>If only the short message is carried, this bit field is reserved. |

TABLE 3-continued

| Field (Item) | Bits | Reference |
|---|---|---|
| Time domain resource assignment | 4 | Carries the row index of the items in pdsch_allocationList in RRC. If only the short message is carried, this bit field is reserved. |
| VRB-to-PRB mapping | 1 | According to TS38.212 Table 7.3.1.2.2-5 0: Non-Interleaved/I: Intverleaved If only the short message is carried, this bit field is reserved. |
| Modulation and coding scheme | 5 | 38.214 - Table 5.1.3.1-1: MCS index table 1 for PDSCH 38.214 - Table 5.1.3.1-2: MCS index table 2 for PDSCH If only the short message is carried, this bit field is reserved. |
| TB Scaling | 2 | If only the short message is carried, this bit field is reserved. |
| PDCCHOrderIndex | X bits | For MBS, use the reserved bits for indication of PDCCHOrderIndex |
| Reserved | 6-X | Reserved |

TABLE 4

| Bit | Short Messages |
|---|---|
| 1 | system InfoModification If set to 1: indication of a BCCH modification other than SIB6, SIB7 and SIB8. |
| 2 | etwsAndCmasIndication If set to 1: indication of an ETWS primary notification and/or an ETWS secondary notification and/or a CMAS notification |
| 3 | stop PagingMonitoring This bit can be used for only operation with shared spectrum channel access and if nrofPDCCH-MonitoringOccasionPerSSB-InPO is present. If set to 1: indication that the UE may stop monitoring PDCCH occasion(s) for paging in this Paging Occasion as specified in TS 38.304 [20], clause 7.1. |
| 4 | Indication of PDCCH order This bit can be used for PDCCH order indication If set to 1: indication that the terminal device operates according to the PDCCH order procedure. |
| 5-[8] | Not used in this release of the specification, and shall be ignored by UE if received. |

Conventionally, the fourth bit or bit "4" in "Short Messages" field is reserved. In the example as shown in Tables 3 and 4, the PDCCH order is considered as a short message. In this case, a new row (the fifth row) is added in Table 4 to define the PDCCH order is a short message. When the "Short Messages" field in Table 3 is set to be "00010000" indicating that the terminal device operates according to the PDCCH order procedure.

It should to understood that the DCI format 1_0 for the PDCCH order has been described by way of example. The scope of the present disclosure is not limited thereto. Any other formats of the DCI may be applied to the present disclosure.

In some example embodiments, the request for the indication that at least one multicast broadcast service is to be received by the first device 110 may be carried in the DCI format 1_0 with CRC scrambled with the P-RNTI. For example, part or all of the reserved six bits in the DCI format 1_0 with CRC scrambled with the P-RNTI may be re-defined and used for carrying the request as shown in above Table 1 or 3. The second device 120 may transmit, to the first device 110, further configuration information about the number of the at least part of reserved bits to be used for the request. Hereinafter, for the purpose of discussion, the request is also referred to as "PDCCHOrderIndex". As shown in Tables 1 and 3, "PDCCHOrderIndex" field comprises X bits. For example, the value of X may be configured by the second device 120 with the further configuration information.

In some example embodiments, PDCCHOrderIndex may be associated with information about the random access preamble. The information comprising at least one of the following: a random access preamble index, a physical random access channel (PRACH) mask index, or the number of repetitions of the random access preamble. In this manner, the first device 110 may determine the information about the random access preamble based on the received PDCCHOrderIndex. With the information about the random access preamble, the first device 110 may determine when and how to transmit the random access preamble.

In some example embodiments, different random access preamble indexes may be associated with different MBS services. For example, PDCCHOrderIndex #0 may be associated with random access preamble index #0 and PRACH mask index #0 for MBS service with G-RNTI-0 as well as number of repetitions of the random access preamble; PDCCHOrderIndex #1 may be associated with random access preamble index #1 and PRACH mask index #0 for MBS service with G-RNTI-1 as well as number of repetitions of the random access preamble.

In some example embodiments, in order to improve efficiency, the same random access preamble index may be associated with different MBS services and with different PRACH mask index. For example, PDCCHOrderIndex #2 may be associated with random access preamble index #2 and PRACH mask index #0 for MBS service with G-RNTI-2 as well as number of repetitions of the random access preamble; PDCCHOrderIndex #3 may be associated with random access preamble index #2 and PRACH mask index #1 for MBS service with G-RNTI-3 as well as number of repetitions of the random access preamble.

In some example embodiments, the second device 120 may transmit 210, to the first device 110, configuration information about an association between the PDCCHOrderIndex and the information about the random access preamble. For example, the second device 120 may transmit the configuration information via broadcast system information block (SIB) or multicast control channel. Accordingly, the first device 110 receives 220 the configuration information from the second device 120.

In some example embodiments, the second device 120 may indicate to the first device 110 that at least part of reserved bits in the DCI are used for the request. For example, the second device 120 may indicate that at least part of reserved bits in the DCI format 1_0 with CRC scrambled with the P-RNTI are used for the request. In some example embodiments, the configuration information may indicate that at least part of reserved bits in the DCI are used for the request. Thus, upon receiving the DCI, the first device 110 will interpret the DCI as indicated by the second device 120. This means that the network implementation may choose whether to use this newly defined format or not. The reserved bits may be used for other purpose if MBS will not get implemented or considered as lower priority.

In some example embodiments, the configuration information may be predefined.

Figure 3:
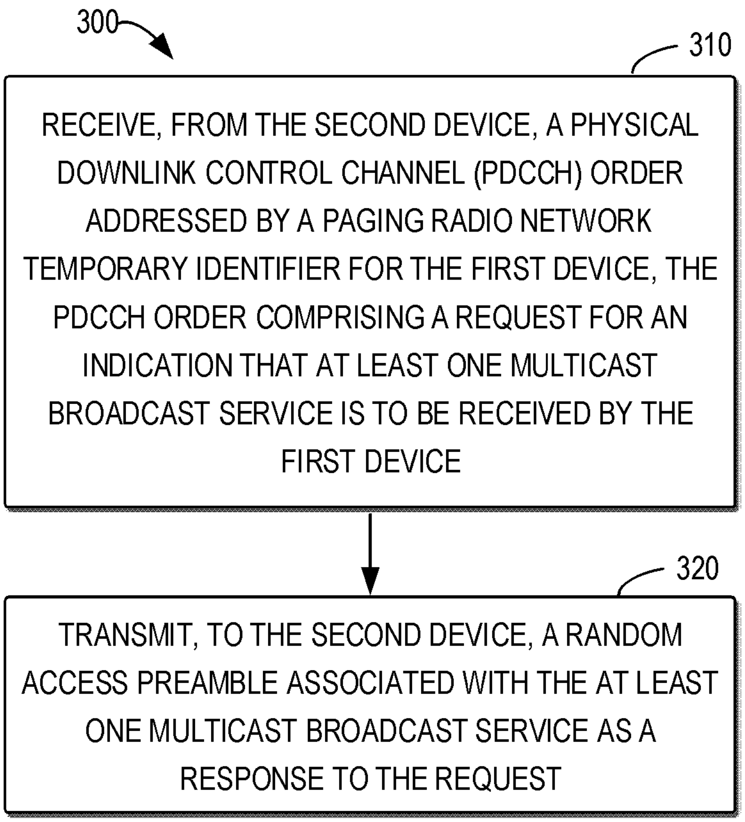
FIG. 3 illustrates a flowchart of a method implemented at a first device in accordance with some example embodiments of the present disclosure.

FIG. 3 shows a flowchart of an example method 300 implemented at a first device in accordance with some example embodiments of the present disclosure. For the purpose of discussion, the method 300 will be described from the perspective of the first device 110 with respect to FIG. 1.

At block 310, the first device 110 receives, from the second device 120, a PDCCH order addressed by a P-RNTI for the first device 110. The PDCCH order comprises a request for an indication that at least one multicast broadcast service is to be received by the first device 110.

At block 320, the first device 110 transmits, to the second device 120, a random access preamble associated with the at least one multicast broadcast service as a response to the request. In this manner, the first device 110 that monitors the single PDCCH order may have less power consumption.

In some example embodiments, the first device 110 may receive the PDCCH order by receiving DCI for at least one of short messages and scheduling information for a paging message. The DCI comprises an indication of the PDCCH order.

In some example embodiments, the DCI comprises a first field for a short message indicator, and the first field comprises the indication of the PDCCH order.

In some example embodiments, the DCI comprises a second field for the short messages, and the second field comprises the indication of the PDCCH order.

In some example embodiments, the request is associated with information about the random access preamble, the information comprising at least one of the following: a random access preamble index, a physical random access channel mask index, or the number of repetitions of the random access preamble.

In some example embodiments, additionally, the first device 110 may receive, from the second device 120, configuration information about an association between the request and the information about the random access preamble.

In some example embodiments, the configuration information indicates that at least part of reserved bits in the DCI are used for the request.

In some example embodiments, additionally, the first device 110 may receive, from the second device, further configuration information about the number of the at least part of reserved bits.

In some example embodiments, the first device 110 is in an idle mode or an inactive mode.

Figure 4:
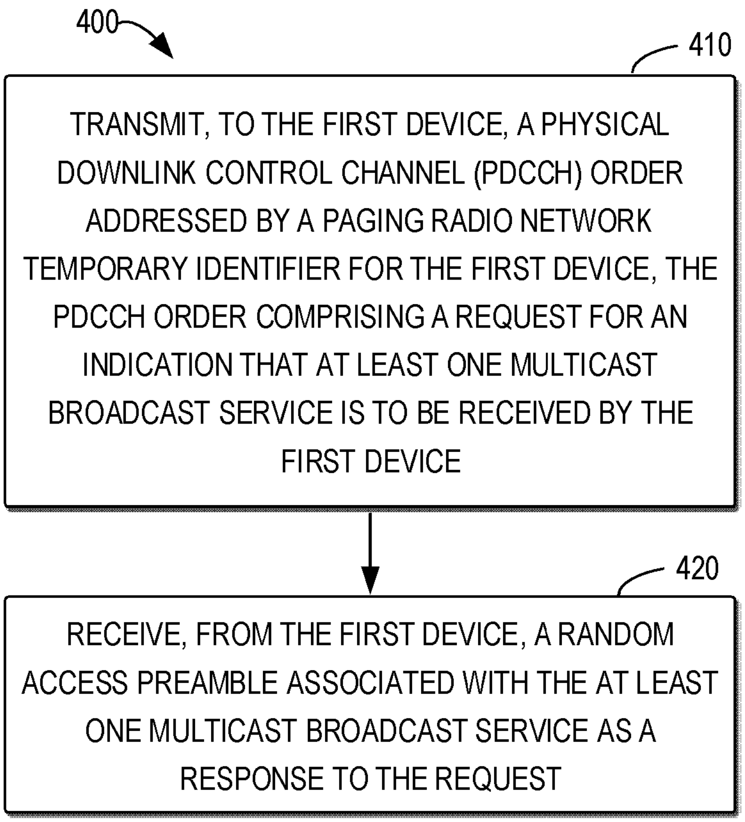
FIG. 4 illustrates a flowchart of a method implemented at a second device in accordance with some example embodiments of the present disclosure.

FIG. 4 shows a flowchart of an example method 400 implemented at a second device in accordance with some example embodiments of the present disclosure. For the purpose of discussion, the method 400 will be described from the perspective of the second device 120 with respect to FIG. 1.

At block 410, the second device 120 transmits, to the first device 110, a PDCCH order addressed by a paging radio network temporary identifier for the first device 110. The PDCCH order comprises a request for an indication that at least one multicast broadcast service is to be received by the first device 110.

At block 420, the second device 120 receives, from the first device 110, a random access preamble associated with the at least one multicast broadcast service as a response to the request.

In some example embodiments, the second device 120 may transmit the PDCCH order by transmitting DCI for at least one of short messages and scheduling information for a paging message. The DCI comprises an indication of the PDCCH order.

In some example embodiments, the DCI comprises a first field for a short message indicator, and the first field comprises the indication of the PDCCH order.

In some example embodiments, the DCI comprises a second field for the short messages, and the second field comprises the indication of the PDCCH order.

In some example embodiments, the request is associated with information about the random access preamble, the information comprising at least one of the following: a random access preamble index, a physical random access channel mask index, or the number of repetitions of the random access preamble.

In some example embodiments, the second device 120 may transmit, to the first device 110, configuration information about an association between the request and the information about the random access preamble.

In some example embodiments, the configuration information indicates that at least part of reserved bits in the DCI are used for the request.

In some example embodiments, the second device 120 may transmit, to the first device 110, further configuration information about the number of the at least part of reserved bits.

In some example embodiments, the first device 110 is in an idle mode or an inactive mode.

Figure 5:
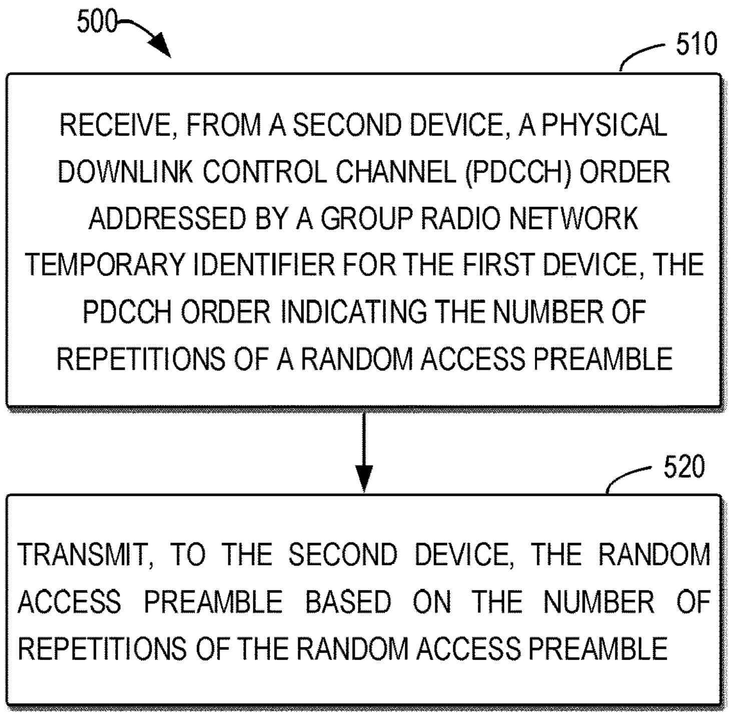
FIG. 5 illustrates a flowchart of a method implemented at a first device in accordance with some other example embodiments of the present disclosure.

FIG. 5 shows a flowchart of an example method 500 implemented at a first device in accordance with some example embodiments of the present disclosure. For the purpose of discussion, the method 500 will be described from the perspective of the first device 110 with respect to FIG. 1.

At block 510, the first device 110 receives, from the second device 120, a PDCCH order addressed by a G-RNTI for the first device. The PDCCH order indicates the number of repetitions of a random access preamble.

At block 520, the first device 110 transmits, to the second device 120, the random access preamble based on the number of repetitions of the random access preamble.

In some example embodiments, the second device 120 may transmit the PDCCH order by transmitting DCI for carrying information about the random access preamble.

In some example embodiments, the DCI may comprise DCI format 1_0 with CRC scrambled with the G-RNTI for the first device 110. Table 5 shows fields in the DCI format 1_0 with CRC scrambled with the G-RNTI in accordance with some example embodiments of the present disclosure.

TABLE 5

| Field (Item) | Bits | Reference |
|---|---|---|
| Identifier for DCI formats | 1 | Set to 1, indicating a DL DCI format |
| Frequency domain resource assignment | Variable | Set the value to be All "1" |
| Random Access Preamble index | 6 bits | 6 bits according to ra-PreambleIndex in Clause 5.1.2 of [8, TS38.321] |
| UL/SUL indicator | 1 bits | If the value of the "Random Access Preamble index" is not all zeros and if the UE is configured with supplementaryUplink in ServingCellConfig in the cell, this field indicates which UL carrier in the cell to transmit the PRACH according to Table 7.3.1.1.1-1; otherwise, this field is reserved |
| SS/PBCH index | 6 bits | If the value of the "Random Access Preamble index" is not all zeros, this field indicates the SS/PBCH that shall be used to determine the RACH occasion for the PRACH transmission; otherwise, this field is reserved. |
| PRACH Mask Index | 4 bits | If the value of the "Random Access Preamble index" is not all zeros, this field indicates the RACH occasion associated with the SS/PBCH indicated by "SS/PBCH index" for the PRACH transmission, according to Clause 5.1.1 of [8, TS38.321]; otherwise, this field is reserved |
| NumOfRepetition_Preamble | X bits | Use some of the reserved bits |
| Reserved bits | 10-X bits | 12 bits for operation in a cell with shared spectrum channel access; otherwise 10 bits |

As shown in Table 5, DCI format 1_0 with CRC scrambled with the G-RNTI is similar to DCI format 1_0 with CRC scrambled with the C-RNTI except that a new field "NumOfRepetition_Preamble" is added by using some of the reserved bits in DCI format 1_0 with CRC scrambled with the C-RNTI. The new field "NumOfRepetition_Preamble" indicates the number of repetitions of the random access preamble. For example, if the field utilizes two bits, then the network could configure up to four repetitions, three bits—eight repetitions, and so on.

Figure 6:
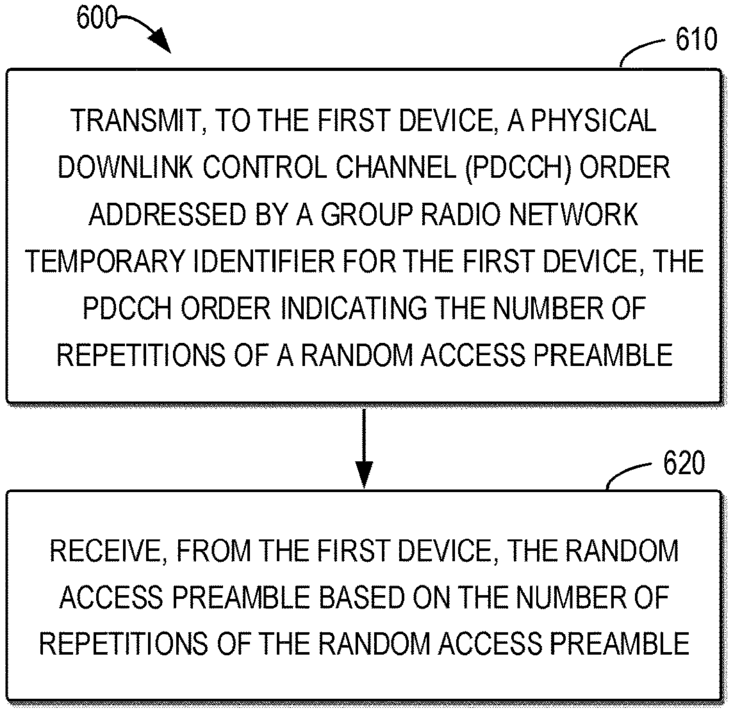
FIG. 6 illustrates a flowchart of a method implemented at a second device in accordance with some other example embodiments of the present disclosure.

FIG. 6 shows a flowchart of an example method 600 implemented at a second device in accordance with some example embodiments of the present disclosure. For the purpose of discussion, the method 600 will be described from the perspective of the second device 120 with respect to FIG. 1.

At block 610, the second device 120 transmits, to the first device 110, a PDCCH order addressed by a G-RNTI for the first device 110. The PDCCH order indicates the number of repetitions of a random access preamble.

At block 620, the second device 120 receives, from the first device 110, the random access preamble based on the number of repetitions of the random access preamble.

With the methods 500 and 600, the probability of successful reception of the random access preamble may be increased.

In some example embodiments, a first apparatus capable of performing any of the method 300 (for example, the first device 110) may comprise means for performing the respective operations of the method 300. The means may be implemented in any suitable form. For example, the means may be implemented in a circuitry or software module. The first apparatus may be implemented as or included in the first device 110. In some example embodiments, the means may comprise a processor and a memory.

In some example embodiments, the first apparatus comprises: means for receiving, from a second apparatus, a physical downlink control channel (PDCCH) order addressed by a paging radio network temporary identifier for the first apparatus, the PDCCH order comprising a request for an indication that at least one multicast broadcast service is to be received by the first apparatus; and means for transmitting, to the second apparatus, a random access preamble associated with the at least one multicast broadcast service as a response to the request.

In some example embodiments, the first apparatus may receive the PDCCH order by receiving DCI for at least one of short messages and scheduling information for a paging message. The DCI comprises an indication of the PDCCH order.

In some example embodiments, the DCI comprises a first field for a short message indicator, and the first field comprises the indication of the PDCCH order.

In some example embodiments, the DCI comprises a second field for the short messages, and the second field comprises the indication of the PDCCH order.

In some example embodiments, the request is associated with information about the random access preamble, the information comprising at least one of the following: a random access preamble index, a physical random access channel mask index, or the number of repetitions of the random access preamble.

In some example embodiments, additionally, the first apparatus may receive, from the second apparatus, configuration information about an association between the request and the information about the random access preamble.

In some example embodiments, the first apparatus is in an idle mode or an inactive mode.

In some example embodiments, a second apparatus capable of performing any of the method 400 (for example, the second device 120) may comprise means for performing the respective operations of the method 400. The means may be implemented in any suitable form. For example, the means may be implemented in a circuitry or software module. The first apparatus may be implemented as or included in the second device 120. In some example embodiments, the means may comprise a processor and a memory.

In some example embodiments, the second apparatus comprises: means for transmitting, to a first apparatus, a physical downlink control channel (PDCCH) order addressed by a paging radio network temporary identifier for the first apparatus, the PDCCH order comprising a request for an indication that at least one multicast broadcast service is to be received by the first apparatus; and means for receiving, from the first apparatus, a random access preamble associated with the at least one multicast broadcast service as a response to the request.

In some example embodiments, the second apparatus may transmit the PDCCH order by transmitting DCI for at least one of short messages and scheduling information for a paging message. The DCI comprises an indication of the PDCCH order.

In some example embodiments, the DCI comprises a first field for a short message indicator, and the first field comprises the indication of the PDCCH order.

In some example embodiments, the DCI comprises a second field for the short messages, and the second field comprises the indication of the PDCCH order.

In some example embodiments, the request is associated with information about the random access preamble, the information comprising at least one of the following: a random access preamble index, a physical random access channel mask index, or the number of repetitions of the random access preamble.

In some example embodiments, the second apparatus may transmit, to the first apparatus, configuration information about an association between the request and the information about the random access preamble.

In some example embodiments, the first apparatus is in an idle mode or an inactive mode.

In some example embodiments, a first apparatus capable of performing any of the method 500 (for example, the first device 110) may comprise means for performing the respective operations of the method 500. The means may be implemented in any suitable form. For example, the means may be implemented in a circuitry or software module. The first apparatus may be implemented as or included in the first device 110. In some example embodiments, the means may comprise a processor and a memory.

In some example embodiments, the first apparatus comprises: means for receiving, from a second apparatus, a physical downlink control channel (PDCCH) order addressed by a group radio network temporary identifier for the first apparatus, the PDCCH order indicating the number of repetitions of a random access preamble; and means for transmitting, to the second apparatus, the random access preamble based on the number of repetitions of the random access preamble.

In some example embodiments, a second apparatus capable of performing any of the method 600 (for example, the second device 120) may comprise means for performing the respective operations of the method 600. The means may be implemented in any suitable form. For example, the means may be implemented in a circuitry or software module. The first apparatus may be implemented as or included in the second device 120. In some example embodiments, the means may comprise a processor and a memory.

In some example embodiments, the second apparatus comprises: means for transmitting, to a first apparatus, a physical downlink control channel (PDCCH) order addressed by a group radio network temporary identifier for the first apparatus, the PDCCH order indicating the number of repetitions of a random access preamble; and means for receiving, from the first apparatus, the random access preamble based on the number of repetitions of the random access preamble.

Figure 7:
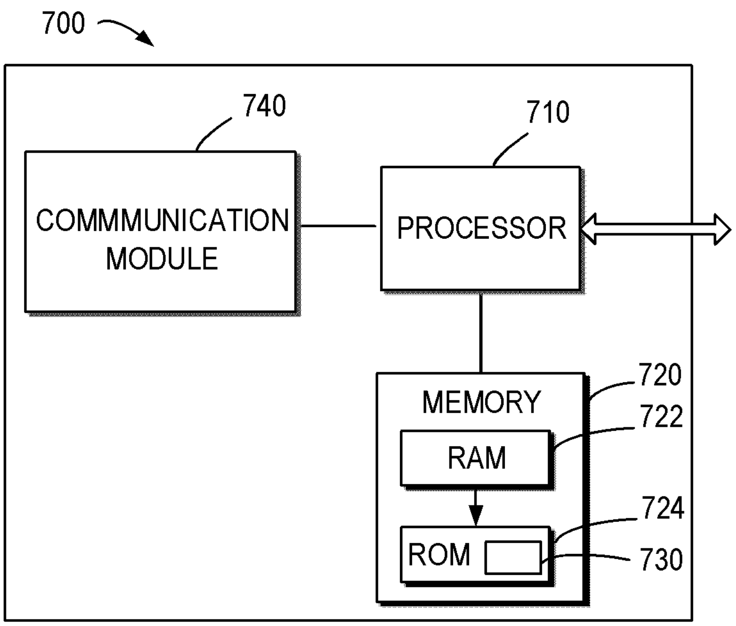
FIG. 7 illustrates a simplified block diagram of an apparatus that is suitable for implementing example embodiments of the present disclosure.

FIG. 7 is a simplified block diagram of a device 700 that is suitable for implementing example embodiments of the present disclosure. The device 700 may be provided to implement a communication device, for example, the first device 110 or the second device 120 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has one or more communication interfaces to facilitate communication with one or more other modules or devices. The communication interfaces may represent any interface that is necessary for communication with other network elements. In some example embodiments, the communication module 740 may include at least one antenna.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the memory, e.g., ROM 724. The processor 710 may perform any suitable actions and processing by loading the program 730 into the RAM 722.

The example embodiments of the present disclosure may be implemented by means of the program 730 so that the device 700 may perform any process of the disclosure as discussed with reference to FIGS. 2 to 6. The example embodiments of the present disclosure may also be implemented by hardware or by a combination of software and hardware.

Figure 8:
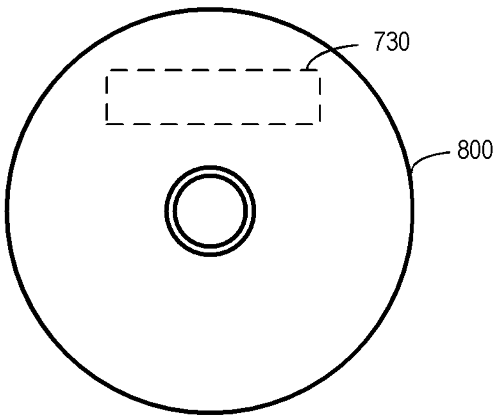
FIG. 8 illustrates a block diagram of an example computer readable medium in accordance with some example embodiments of the present disclosure.

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 which may be in form of CD, DVD or other optical storage disk. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIGS. 2 to 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:

at least one processor; and at least one memory including computer program code;

wherein the at least one memory and the computer program code are configured to, with the at least one processor, cause the first device to:

receive, from a second device, a physical downlink control channel order addressed by a paging radio network temporary identifier for the first device, the physical downlink control channel order comprising a request for an indication that at least one multicast broadcast service is to be received by the first device, wherein the first device receives the physical downlink control channel order by receiving downlink control information for at least one of short messages and scheduling information for a paging message, the downlink control information comprising an indication of the physical downlink control channel order; and transmit, to the second device, a random access preamble associated with the at least one multicast broadcast service as a response to the request, wherein the request is associated with information about the random access preamble, the information comprising the number of repetitions of the random access preamble;

receive, from the second device, configuration information about an association between the request and the information about the random access preamble, the configuration information indicating that at least part of reserved bits in the downlink control information are used for the request; and receive, from the second device, further configuration information about the number of the at least part of reserved bits.

2. The first device of claim 1, wherein the downlink control information comprises a first field for a short message indicator, and the first field comprises the indication of the physical downlink control channel order.

3. The first device of claim 1, wherein the downlink control information comprises a second field for the short messages, and the second field comprises the indication of the physical downlink control channel order.

4. The first device of claim 1, wherein the first device is in an idle mode or an inactive mode.

5. A second device, comprising:

at least one processor; and at least one memory including computer program code;

wherein the at least one memory and the computer program code are configured to, with the at least one processor, cause the second device to:

transmit, to a first device, a physical downlink control channel order addressed by a paging radio network temporary identifier for the first device, the physical downlink control channel order comprising a request for an indication that at least one multicast broadcast service is to be received by the first device, wherein the second device transmits the physical downlink control channel order by transmitting downlink control information for at least one of short messages and scheduling information for a paging message, the downlink control information comprising an indication of the physical downlink control channel order; and receive, from the first device, a random access preamble associated with the at least one multicast broadcast service as a response to the request, wherein the request is associated with information about the random access preamble, the information comprising the number of repetitions of the random access preamble;

transmit, to the first device, configuration information about an association between the request and the information about the random access preamble, the configuration information indicating that at least part of reserved bits in the downlink control information are used for the request; and transmit, to the first device, further configuration information about the number of the at least part of reserved bits.

6. The second device of claim 5, wherein the downlink control information comprises a first field for a short message indicator, and the first field comprises the indication of the physical downlink control channel order.

7. The second device of claim 5, wherein the downlink control information comprises a second field for the short messages, and the second field comprises the indication of the physical downlink control channel order.

8. A method, comprising:

receiving, at a first device from a second device, a physical downlink control channel order addressed by a paging radio network temporary identifier for the first device, the physical downlink control channel order comprising a request for an indication that at least one multicast broadcast service is to be received by the first device, wherein the first device receives the physical downlink control channel order by receiving downlink control information for at least one of short messages and scheduling information for a paging message, the downlink control information comprising an indication of the physical downlink control channel order; and transmitting, to the second device, a random access preamble associated with the at least one multicast broadcast service as a response to the request, wherein the request is associated with information about the random access preamble, the information comprising the number of repetitions of the random access preamble;

receiving, from the second device, configuration information about an association between the request and the information about the random access preamble, the configuration information indicating that at least part of reserved bits in the downlink control information are used for the request; and receiving, from the second device, further configuration information about the number of the at least part of reserved bits.

9. The method of claim 8, wherein the downlink control information comprises a first field for a short message indicator, and the first field comprises the indication of the physical downlink control channel order.

10. The first device of claim 1, wherein the downlink control information comprises downlink control information format 1_0 with cyclic redundancy check scrambled with the paging radio network temporary identifier, and wherein the reserved bits comprise six bits, and the at least part of reserved bits used for the request comprises a PDCCHOrderIndex field of a number of bits of the six reserved bits, wherein the number of bits is indicated by the further configuration information.

11. The first device of claim 10, wherein different values of the PDCCHOrderIndex field are associated with different multicast broadcast services identified by different group radio network temporary identifiers, each value being associated with a respective random access preamble index and a respective physical random access channel mask index.

12. The first device of claim 11, wherein the configuration information is received via a broadcast system information block or a multicast control channel and wherein at least two of the different multicast broadcast services share a same random access preamble index and are differentiated by different physical random access channel mask indexes.

13. The first device of claim 12, wherein the physical downlink control channel order does not initiate a full random access procedure, and the random access preamble indicates that the first device has an interest in the at least one multicast broadcast service.

14. The first device of claim 13, wherein the at least one memory and the computer program code are configured to, with the at least one processor, further cause the first device to monitor the physical downlink control channel order on a physical downlink control channel monitoring occasion that is the same as a physical downlink control channel monitoring occasion for paging.

15. The first device of claim 1, wherein the at least one memory and the computer program code are configured to, with the at least one processor, further cause the first device to determine the information about the random access preamble based on a value of the request.

16. The first device of claim 1, wherein the downlink control information comprises a Short Message Indicator field, and the Short Message Indicator field is set to "00" to indicate that the physical downlink control channel order is present in the downlink control information.

17. The method of claim 8, wherein the downlink control information comprises downlink control information format 1_0 with cyclic redundancy check scrambled with the paging radio network temporary identifier, and wherein the reserved bits comprise six bits, and the at least part of reserved bits used for the request comprises a PDCCHOrderIndex field of a number of bits of the six reserved bits, wherein the number of bits is indicated by the further configuration information.

18. The method of claim 17, wherein different values of the PDCCHOrderIndex field are associated with different multicast broadcast services identified by different group radio network temporary identifiers, each value being associated with a respective random access preamble index and a respective physical random access channel mask index.

19. The method of claim 18, wherein the configuration information is received via a broadcast system information block or a multicast control channel.

20. The method of claim 8, wherein the physical downlink control channel order does not initiate a full random access procedure, and the random access preamble indicates that the first device has an interest in the at least one multicast broadcast service.

* * * * *